United States Patent [19]

Ouellette et al.

[11] Patent Number: 5,038,721

[45] Date of Patent: Aug. 13, 1991

[54] ANIMAL WASTE COLLECTION SYSTEM COMPRISING NONSORBENT, NONCLUMPING LITTER, LIQUID SORBENT MEANS AND FILTER

[75] Inventors: William R. Ouellette, Cincinnati; John L. Hammons, Hamilton; Bruce W. Lavash, West Chester, all of Ohio

[73] Assignee: The Procter & Gamble Company, Cincinnati, Ohio

[21] Appl. No.: 507,695

[22] Filed: Apr. 10, 1990

[51] Int. Cl.$^5$ ............................................. A01K 29/00
[52] U.S. Cl. ..................................... 119/167; 119/169; 119/170
[58] Field of Search .................... 119/1, 165, 166, 169, 119/170

[56] References Cited

U.S. PATENT DOCUMENTS

| 3,796,188 | 3/1974 | Bradstreet | 119/1 |
| 3,809,013 | 5/1974 | Rigney et al. | 119/1 |
| 3,828,731 | 8/1974 | White | 119/1 |

(List continued on next page.)

FOREIGN PATENT DOCUMENTS 2614502A 11/1988 France .

OTHER PUBLICATIONS

PCT International Publication No. WO88/00434, International Publication Date 1/28/88, P. Yananton–Non-absorbent litter for use with absorbent pad.
Co-pending commonly assigned U.S. patent application of J. L. Hammons et al., Ser. No. 507,696 filed Apr. 10, 1990 (No copy supplied).
Pet litter box system which prevents the development of unpleasant odors.
Co-pending commonly assigned U.S. patent application of B. W. Lavash, Ser. No. 507,697 filed Apr. 10, 1990 (No copy supplied)–Filtering & disposal system for granular materials such as pet litter.

Primary Examiner—Gene Mancene
Assistant Examiner—R. Thomas Price
Attorney, Agent, or Firm—E. Kelly Linman; John V. Gorman; Richard C. Witte

[57] ABSTRACT

A system which separates the pet excreta collection, storage and disposal functions wherein each individual component used to perform each of these functions is optimized for its intended purpose. The system of the present invention permits almost indefinite recycling of the substantially nonsorbent, nonclumping granular litter material used by the animal to bury its solid excreta. The combination of the present invention includes a porous filtering member exhibiting a pore size which will readily permit the granular litter material to pass therethrough, yet retain substantially all of the solid animal excreta coming in contact with the fitering member during the filtering operation. A protective member capable of substantially resisting damage when subjected to digging or clawing by animals is secured in superposed relation to and completely overlies the uppermost surface of the porous filtering member. The protective member includes means for forming an opening having a predetermined periphery in its uppermost surface when the protective member is lifted from the litter box to initiate the filtering operation. The filtering member is secured in underlying relation about the predetermined periphery of the opening formed in the protective member so that the filtering member is protected from damage due to digging or clawing by animals during the normal use cycle, yet substantially all of the nonsorbent, nonclumping granular litter material containing the solid animal excreta will pass through the opening and be filtered by the filtering member when the protective member is lifted from the litter box. The protective member further includes liquid sorbent means for sorbing liquid animal excreta so that the liqud animal excreta contained in the sorbent means can be removed from the litter box and disposed of along with the solid animal excreta retained on the filtering member when the filtering operation has been completed.

11 Claims, 5 Drawing Sheets

U.S. PATENT DOCUMENTS

| | | | |
|---|---|---|---|
| 3,892,846 | 7/1975 | Wortham | 424/76 |
| 3,965,863 | 6/1976 | Scott | 119/1 |
| 4,096,827 | 6/1978 | Cotter | 119/1 |
| 4,203,388 | 5/1980 | Cortigene et al. | 119/1 |
| 4,279,217 | 7/1981 | Behringer | 119/1 |
| 4,308,825 | 1/1982 | Stephanian | 119/1 |
| 4,312,295 | 1/1982 | Harrington | 719/1 |
| 4,405,354 | 9/1983 | Thomas, II et al. | 71/21 |
| 4,458,629 | 7/1984 | Gerber | 119/1 |
| 4,469,046 | 9/1984 | Yananton | 119/1 |
| 4,471,717 | 9/1984 | Lander | 119/1 |
| 4,494,481 | 1/1985 | Rodriguez et al. | 119/1 |
| 4,494,482 | 1/1985 | Arnold | 119/1 |
| 4,517,919 | 5/1985 | Benjamin et al. | 119/1 |
| 4,534,315 | 8/1985 | Sweeney | 119/1 |
| 4,607,594 | 8/1986 | Thacker | 119/1 |
| 4,615,300 | 10/1986 | McDonough | 119/1 |
| 4,619,862 | 10/1986 | Sokolowski et al. | 119/1 X |
| 4,628,863 | 12/1986 | Eichenauer | 119/1 |
| 4,640,225 | 2/1987 | Yananton | 119/1 |
| 4,649,862 | 3/1987 | Neary | 119/1 |
| 4,711,198 | 12/1987 | Mossbarger | 119/1 |
| 4,721,059 | 1/1988 | Lowe et al. | 119/1 |
| 4,723,510 | 2/1988 | Skillestad | 119/1 |
| 4,724,955 | 2/1988 | Martin et al. | 206/204 |
| 4,727,824 | 3/1988 | Ducharme et al. | 119/1 |
| 4,756,273 | 7/1988 | Yananton | 119/1 |
| 4,763,603 | 8/1988 | Coes | 119/1 |
| 4,766,845 | 8/1988 | Bavas | 119/1 |
| 4,771,731 | 9/1988 | Derx et al. | 119/1 |
| 4,774,907 | 10/1988 | Yananton | 119/1 |
| 4,784,082 | 11/1988 | Wolfe | 119/1 |
| 4,800,841 | 1/1989 | Yananton et al. | 119/1 |
| 4,802,442 | 2/1989 | Wilson | 119/1 |
| 4,817,560 | 4/1989 | Prince et al. | 119/1 |
| 4,824,810 | 4/1989 | Lang et al. | 119/1 X |
| 4,840,140 | 6/1989 | Yananton et al. | 119/1 |
| 4,842,593 | 6/1989 | Jordan et al. | 604/360 |
| 4,844,010 | 7/1989 | Ducharme et al. | 119/1 |
| 4,848,274 | 7/1989 | Yananton | 119/1 |
| 4,852,518 | 8/1989 | Yananton | 119/1 |
| 4,869,204 | 9/1989 | Yananton | 119/1 |
| 4,870,924 | 10/1989 | Wolfe | 119/1 |
| 4,913,954 | 4/1990 | Mack | 428/213 |
| 4,961,930 | 10/1990 | Perdelwitz, Jr. | 424/411 |

# ANIMAL WASTE COLLECTION SYSTEM COMPRISING NONSORBENT, NONCLUMPING LITTER, LIQUID SORBENT MEANS AND FILTER

BACKGROUND

When animals, especially dogs and cats, are kept as pets in dwellings intended primarily for human habitation means must be provided for them to relieve themselves. Traditionally said means has been a box or pan filled with a quantity of absorbent granular material (also known as litter) such as clay.

This use of absorbent granular materials as a receptacle for animal excreta is intended to serve three distinct needs. First, the material acts as a medium in which the pets, particularly cats, can satisfy their natural instinct to dig. Second, the material is intended to absorb urine. Third, the material serves as a receptacle for solid excreta (i.e., feces).

Currently employed absorbent granular materials perform adequately at satisfying the first need. However, current products are extremely poor at the latter two needs. The absorptive capacity of clay is extremely low, usually less than one gram of liquid absorbed per gram of litter. Furthermore, the absorptive process causes the granular material to clump, rendering it unacceptable as a digging medium. This clumping, in addition to the accumulation of feces, necessitates frequent and messy changes of the litter.

Several attempts have been made to eliminate the problem inherent to the system as described. U.S. Pat. No. 4,774,907 issued to Yananton on Oct. 4, 1988 teaches the use of a liquid absorbent pad in conjunction with the clay granules in an attempt to extend the life of the litter. The problem with this solution is that urine must first flow through and potentially be absorbed by the clay granules before it is absorbed by the underlying pad. In this case the pad does not necessarily extend the life of the litter but rather absorbs the "overflow" urine that passes through the urine-soaked o litter. Furthermore, the absorbent pad disclosed in U.S. Pat. No. 4,774,907 does nothing to address the issue of solid waste.

The problem of handling solid waste has been considered in several prior art references. U.S. Pat. No. 4,817,560 issued to Prince et al. on Apr. 4, 1989 and U.S. Pat. No. 4,096,827 issued to Cotter on June 27, 1978 describe reusable filters which are intended to remove feces from the absorbent granular material (i.e. litter). Similarly, U.S. Pat. No. 3,809,013 issued to Rigney on May 7, 1974 and U.S. Pat. No. 4,312,295 issued to Harrington on June 26, 1982 describe disposable filtering mechanisms.

However, none of the aforementioned patents address the inherent problem associated with filtering absorbent litter which has formed clumps due to the absorption of urine. These clumps adversely affect the filtering operation, and are sometimes so large that they impede the flow of "unused" litter through the filtering screen. Furthermore, these clumps often break apart as they are being filtered, thereby releasing an intense and offensive odor.

DISCLOSURE OF THE INVENTION

Accordingly, it is a principal object of the present invention to solve the aforementioned problems by providing a system which separates the pet excreta collection, storage and disposal functions. Each individual component used to perform each of these functions can thus be optimized for its intended purpose. In simplest terms, the present invention comprises the combination of a nonsorbent, nonclumping granular litter material, a sorbent means for the collection of urine underlying the nonsorbent, non-clumping granular litter material and a filter for the removal of solid or fecal matter from the nonsorbent, nonclumping granular litter material.

For the purpose of defining the present invention, the term "nonsorbent" will be used to describe materials or structures which are substantially nonabsorbent and substantially nonadsorbent to liquids. Similarly, the term "sorbent" will be used to describe materials or structures which are substantially absorbent or substantially adsorbent to liquids. Examples of absorbent materials which are considered "sorbent" by the foregoing definition are tissues, polymeric gelling agents (PGA), clay and the like. All of the aforementioned absorbent materials take in fluids and make them a part of their existing structure. By way of contrast, adsorbent materials which are also considered "sorbent" by the foregoing definitions are those which retain fluids in a thin layer on their surface. Perlite is an example of such an adsorbent material.

BRIEF DESCRIPTION OF THE DRAWINGS

While the specification concludes with claims particularly pointing out and distinctly claiming the present invention, it is believed the present invention will be better understood from the following description in conjunction with the accompanying drawings in which:

DETAILED DESCRIPTION OF THE INVENTION

Figure 1:
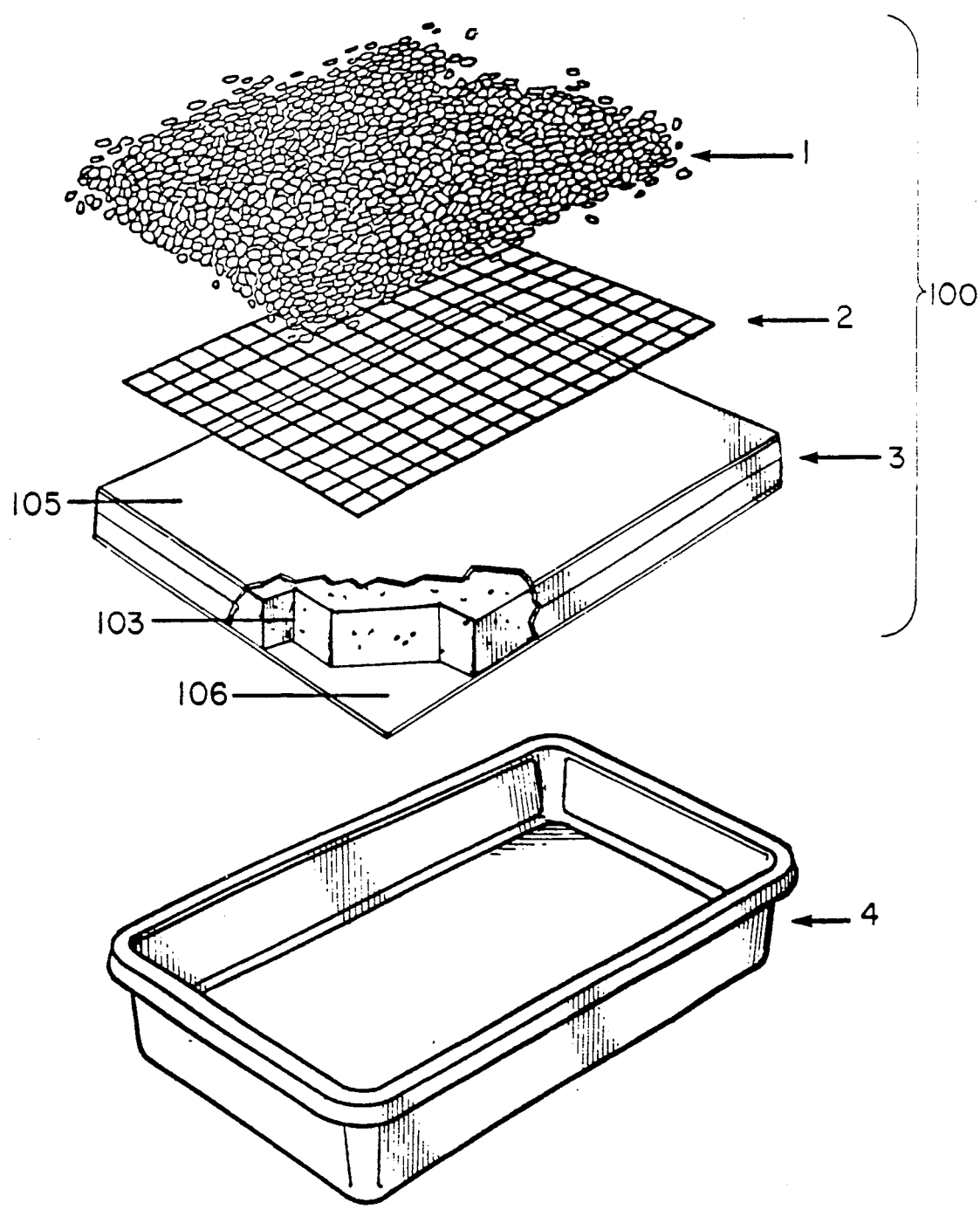
FIG. 1 is an exploded simplified schematic representation of one embodiment of the present invention.

Referring to FIG. 1, the first element of the combination comprising a preferred embodiment of the present invention is the granular litter material 1. The granular litter material is substantially nonsorbent, nonclumping and readily passes urine deposited thereon through to the underlying sorbent means 3. The granular litter material 1 is intended solely to act as a medium in which the pet (particularly cats) may dig to bury their excrement.

To this end there are many suitable materials which are nonsorbent, nonclumping and acceptable to the cat for digging. Gravel, coarse sand, glass beads, plastic pellets, ceramic particles or agglomerates or combinations thereof could be used. Additionally, there are treatments or coatings that could be applied to the aforementioned granular materials which could further improve their fluid transfer properties. Indeed, such coatings could, if desired, be applied to granular materials which are initially sorbent and which tend to clump when wetted (e.g., clay, cellulose pellets, etc.) to render them nonsorbent and nonclumping. Silicones, waxes, metallic stearates and/or ceramics are merely a few of the materials that could be effectively used as coatings and/or treatments to render an initially sorbent material suitable for use in the present invention. Whatever nonsorbent, nonclumping granular litter is ultimately selected, acceptability for use as a digging medium by the cat is of critical importance.

The second element of the combination 100 comprising a preferred embodiment of the present invention is sorbent means 3, which underlies the nonsorbent, nonclumping granular litter material 1. This element is designed specifically to sorb urine. This sorbent means could be a sorbent pad, a sponge or any other sorbent device which maintains its structural integrity so as to permit eventual disposal of the sorbent means and the urine contained therein as an integral unit.

The sorbent means 3 could, for example, be comprised of a core 103 of comminuted wood pulp fluff, tissue, polymeric gelling agent (PGA), combinations thereof or the like, preferably encapsulated by a fluid pervious top sheet 105 adjacent its uppermost surface and a fluid impervious back sheet 106 adjacent its lowermost surface, said top sheet and back sheet preferably being joined to one another about the periphery of said sorbent core. The back sheet 106 normally prevents the absorbed urine from contacting the interior surfaces of the litter box 4.

The third element of the combination 100 comprising a preferred embodiment of the present invention is a filter 2. The filter 2 is designed to allow the nonsorbent, nonclumping granular litter material 1 to easily and readily pass through while retaining the fecal material deposited in the litter by the animal for separate disposal. The filter 2 may be reusable or disposable, and will normally underlie the granular litter material 1, the sorbent means 3, or both. In either case the purpose of the filter 2 is to separate the nonsorbent, nonclumping granular litter material 1 from the pet's fecal excrement.

Cat feces, which is normally cylindrical in shape, has an average length of about 1.25 inches and an average diameter of about 0.60 inches. The range of these measurements are typically about 0.5 inches to about 2.75 inches for length and about 0.25 inches to about 0.80 inches for diameter. On the other hand, granular litter materials which are acceptable to animals for digging or scratching typically exhibit a particle size range, as measured at their maximum dimension, of from less than about 0.010 inches to about 0.4 inches, and most preferably from about 0.04 inches to about 0.20 inches.

The filter 2 is preferably comprised of a highly porous mesh material which will readily allow the nonsorbent, nonclumping litter to flow through it while retaining the solid excrement (feces) which was deposited in the litter by the pet. When used for an ordinary house cat, to effectively filter the feces from the granular litter material 1, filter 2 should have a pore size capable of inscribing a circle having a diameter between about 0.10 inches and about 0.65 inches, most preferably between about 0.25 inches and about 0.45 inches. One example of a suitable filter 2 is a polymeric monofilament scrim having a square shaped opening measuring approximately 0.375 inches, as available from Conwed, 620 NE Taft St., Minneapolis, Minn. 55413, under product designation No. ON5050.

FIG. 1 depicts the filter 2 interposed between the nonsorbent, nonclumping granular material 1 and the sorbent means 3. In this particular execution it is desirable that the filter 2 be of sufficient integrity that it does not lose it integrity as a result of contact with the pet's claw during digging. It is also desirable that the filter 2 not present a hazard to the pet by allowing the pet's claws to become entangled therein.

Figure 2:
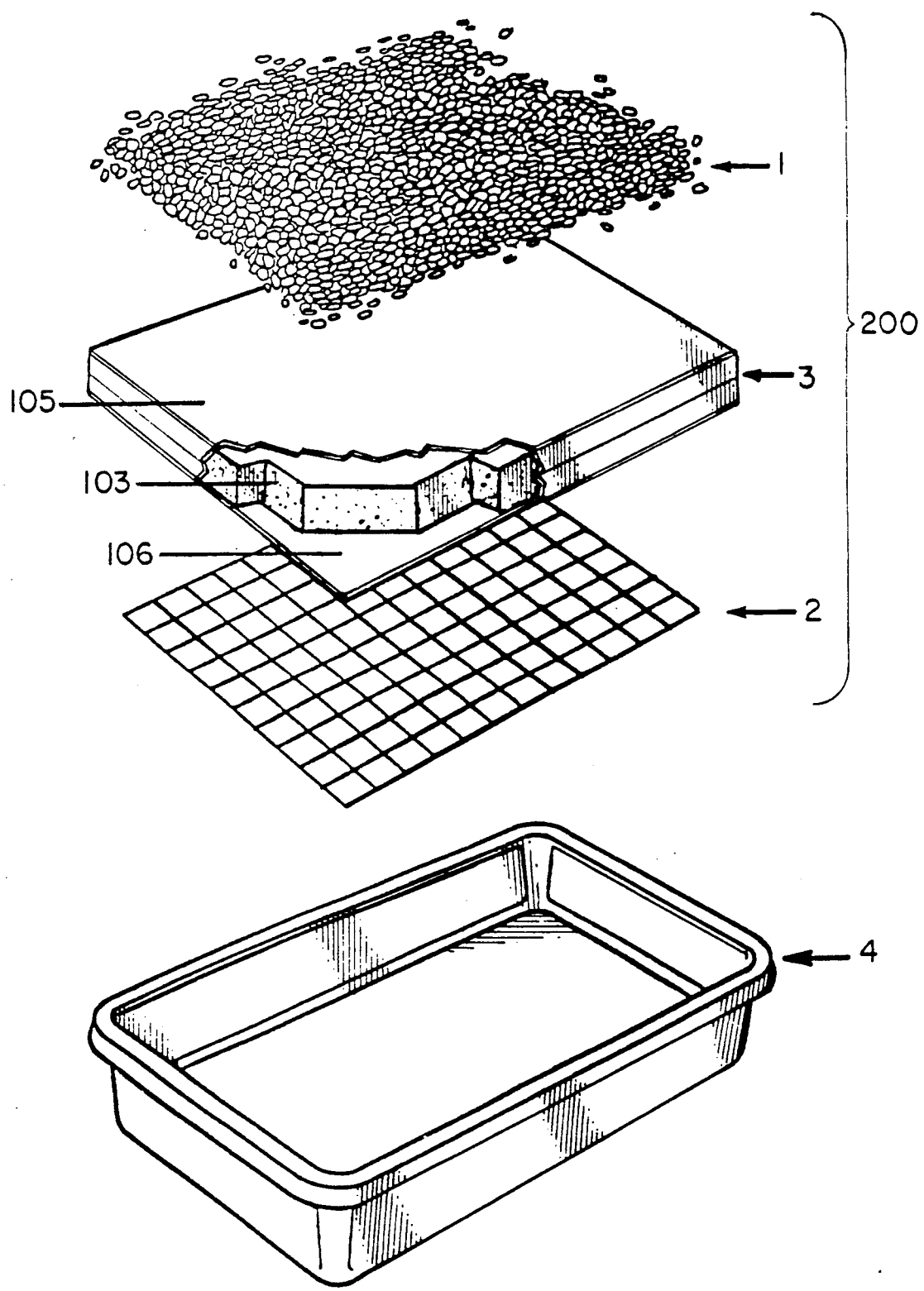
FIG. 2 is an exploded simplified schematic representation of another embodiment of the present invention.

To this end, FIG. 2 depicts another option for placement of the filter 2. In the combination 200 disclosed in FIG. 2, the filter 2 is underlying the sorbent means 3, thus protecting the filter from damage by the animal. In this particular execution the sorbent means 3 will most probably be removed from the litter box 4 prior to initiating the filtering operation. The sorbent means 3 may be removed by sliding it out the edge of the litter box 4, leaving the nonsorbent, nonclumping granular litter material 1, overlying the filter 2. The filter 2 may then be lifted upwardly, allowing the nonsorbent, nonclumping granular litter material 1 to pass through while trapping the feces for separate disposal thereof.

As an alternative to sliding out the sorbent means 3 in a separate operation, a passageway (not shown) which opens upon lifting of the sorbent means can be provided in the sorbent means. The passageway allows the granular litter material 1 to pass therethrough and fall directly onto the filter 2 for subsequent filtering when filter 2 is lifted.

Figure 3:
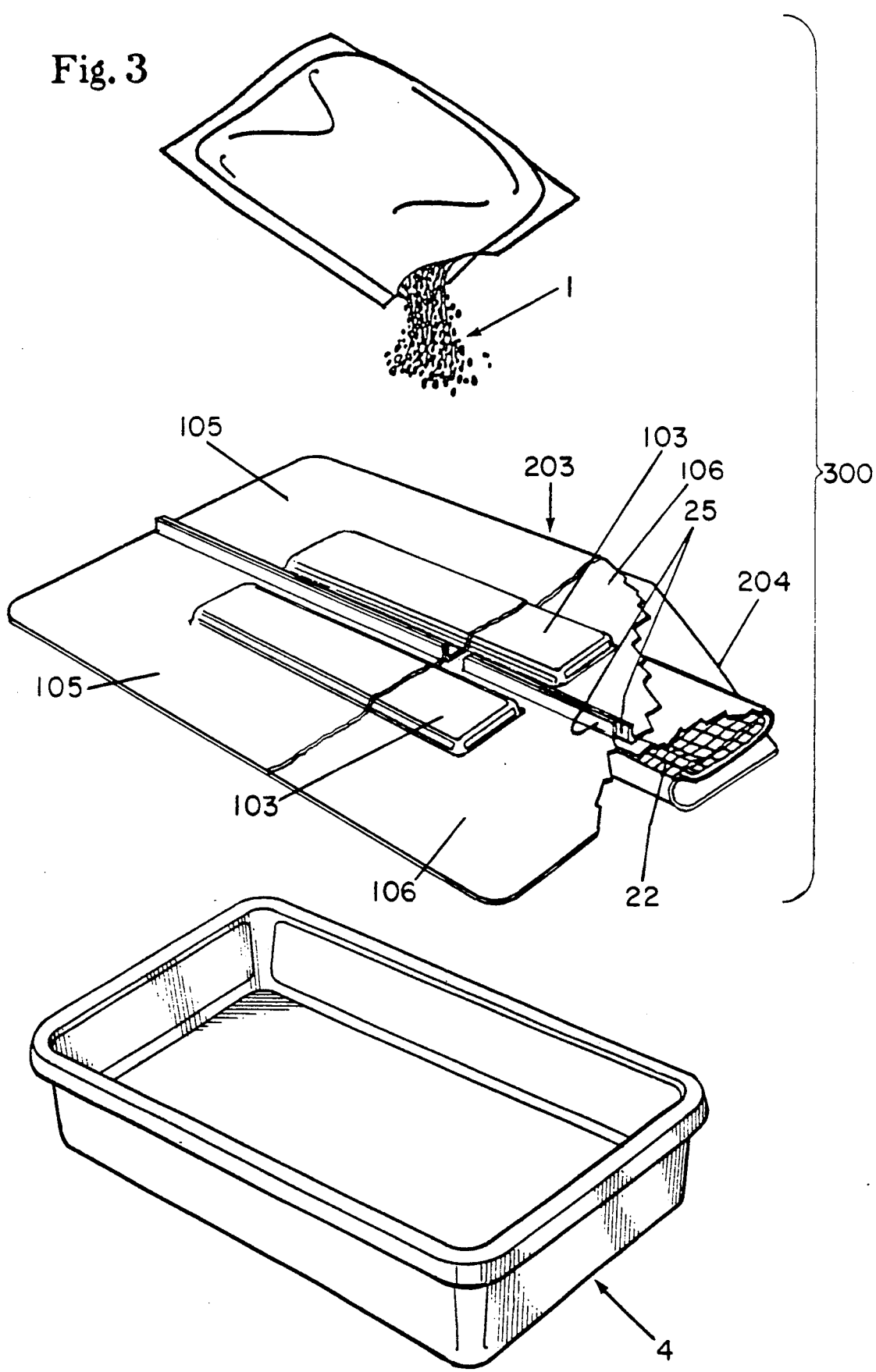
FIG. 3 is an exploded simplified schematic representation of yet another embodiment of the present invention.
Figure 4:
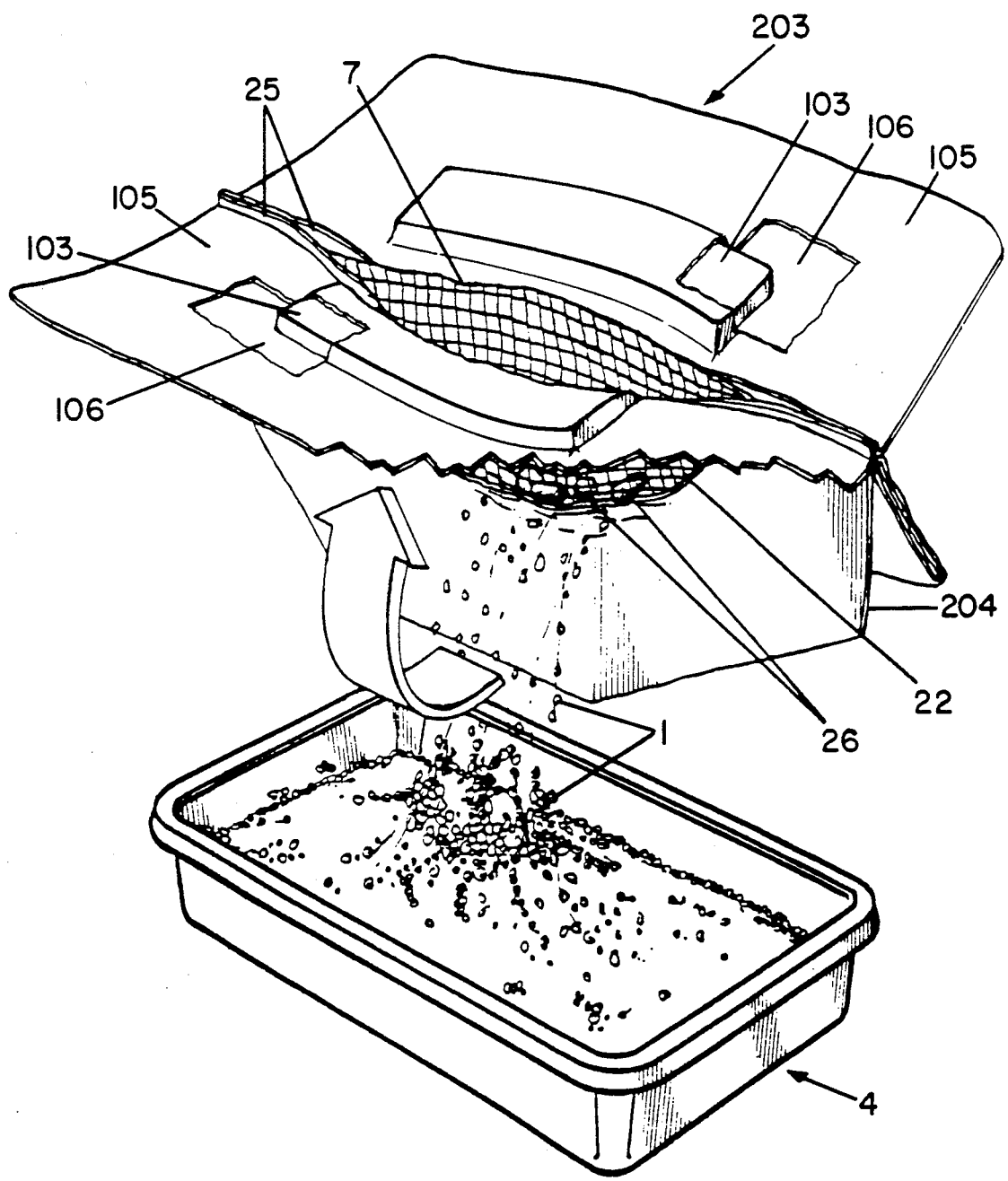
FIG. 4 depicts the embodiment of FIG. 3 during a litter filtering operation.

FIG. 3 depicts a particularly preferred combination 300 of this latter type. The combination 300 therein illustrated employs a combined sorbent means 203 and filter 22, which can be constructed of materials generally similar to those used to construct sorbent means 3 and filter 2. The filter 22 is secured about the periphery of a frangible passageway which opens when the sorbent means 203 is lifted from litter box 4 with granular litter material 1 supported on its uppermost surface, as generally shown in FIG. 4. Sorbent means 203 further includes a pair of absorbent cores 103 sandwiched between a fluid pervious top sheet 105 and a fluid impervious back sheet 106.

As can also be seen from FIG. 4, the weight of the granular litter material 1 causes the central portion of the frangibly secured opposing flanges 25 to separate from one another to form passageway 7 when the sorbent means 203 and attached filter 22 are lifted. (Note that the outermost edges of opposing flanges 25 are more rigorously secured to one another to prevent sorbent means 203 from becoming completely separated into two pieces. The granular litter material 1 passes through filter 22, leaving the feces 26 retained within the filter and the urine contained within absorbent cores 103. If desired, an overwrap 204 may be provided on the lowermost surface of sorbent means 203 to enclose the feces-containing filter 22 for disposal along with sorbent means 203, including urine-soaked absorbent cores 103.

Figure 5:
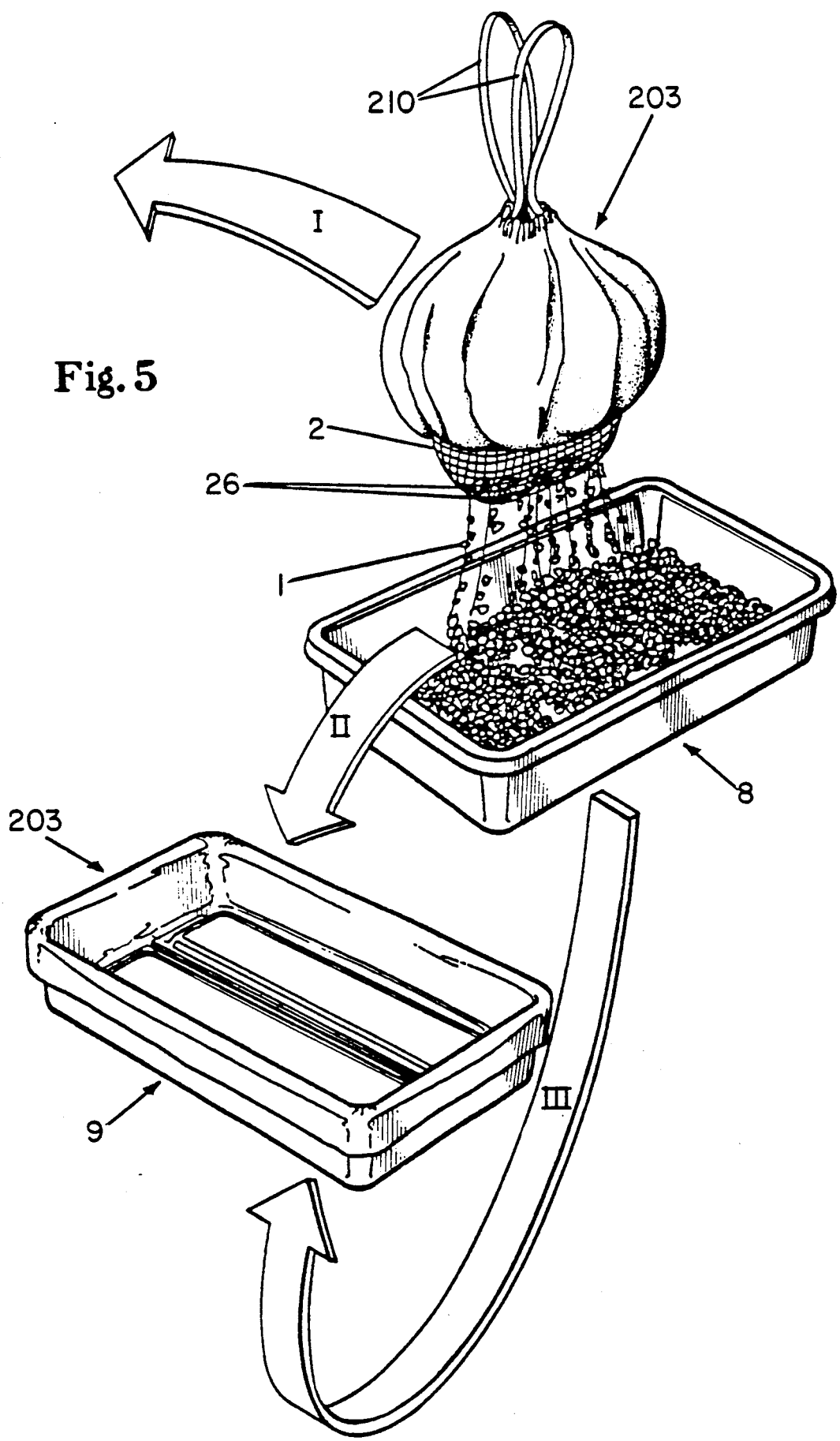
FIG. 5 depicts a series of steps which may be repeatedly employed to recycle the granular litter material almost indefinitely.

FIG. 5 depicts a method to facilitate continuous recycling of the granular litter material 1. The first step, as indicated by arrow I, is to lift the combined sorbent means 203 and filter 22 from a first litter box 8 by means of a pair of optional drawstring handles 210, thereby separating the absorbed urine and feces 26 from the nonsorbent, nonclumping granular litter material 1, which falls into a first litter box 8. (Note that the overwrap 204 has been deleted for clarity in FIG. 5.) The second step, as indicated by arrow II, is to pour the refreshed granular litter material 1 into a second litter box 9 into which another combined sorbent means 203 and filter 22 has already been placed. The final step, as indicated by arrow III, is to now place the first litter box 8 under the second litter box 9 for storage until it is time to repeat the operation with the litter boxes changing positions.

To maximize recycling of the nonsorbent, nonclumping granular litter material 1, it is recognized that the nonsorbent, nonclumping granular litter material used in practicing the present invention may be treated with one or more odor abating agents. Such agents may be selected from the family of antimicrobials, antifungals, bacteriostats, deodorants, bacterial enzyme inhibitors, acidic buffers, or the like. These odor abaters may also, if desired, be incorporated into the sorbent means 3, or 203, which underlie the granular litter material 1 in use, to minimize objectionable odors during the normal use cycle of the combinations comprising the present invention.

While particular embodiments of the present invention have been illustrated and described, it will be obvious to those skilled in the art that various changes and modifications can be made without departing from the spirit and scope of the invention, and it is intended to cover in the appended claims all such modifications that are within the scope of this invention.

What is claimed is:

1. A self-contained animal waste collection system for use in a litter box, said system permitting almost indefinite recycling of the granular litter material employed therein without adverse effects, said system comprising in combination:
    (a) a predetermined quantity of substantially nonsorbent, nonclumping granular litter material in which the animal may dig and/or bury its solids excreta for deposition into said litter box;
    (b) a porous filtering member having an uppermost surface and exhibiting a pore size which will readily permit the nonsorbent, nonclumping granular litter material to pass therethrough, yet retain substantially all of the solid animal excreta coming in contact therewith during the filtering operation on its uppermost surface;
    (c) a protective member for insertion into said litter box, said protective member having a predetermine substantially coinciding with said litter box and an uppermost surface which contacts the nonsorbent, nonclumping granular litter material contained in said litter box in use and which is capable of substantially resisting damage when subjected to digging or clawing by animals secured in superposed relation to and completely overlying said uppermost surface of said porous filtering member, said protective member including means for forming an opening having a predetermined periphery in its uppermost surface when said protective member is lifted from the litter box to initiate the filtering operation, said filtering member being secured in underlying relation about said predetermined periphery of said opening in said protective member so that said filtering member is protected from damage due to digging or clawing by animals during the normal use cycle by said overlying protective member, yet substantially all of the nonsorbent, nonclumping granular litter material containing said solid animal excreta which is located on said uppermost surface of said protective member will pass through said opening and be filtered by said filtering member when said protective member is lifted from said litter box; and
    (d) liquid sorbent means for absorbing liquid animal excreta underlying said quantity of nonsorbent, nonclumping granular litter material and secured to said protective member so that liquid animal excreta contained within said sorbent means is removed from said litter box and disposed of along with said solid animal excreta retained within said filtering member when said filtering operation has been completed.

2. The animal waste collection system of claim 1, wherein said granular litter material is selected from the group consisting of: gravel, glass beads, coarse sand, plastic pellets, ceramic particles and combinations thereof.

3. The animal waste collection system of claim 1, wherein said nonsorbent, nonclumping granular litter material comprises a material which is not initially nonsorbent and nonclumping, but which is treated or coated with a material selected from the group consisting of: silicones, waxes, metallic stearates and ceramics, to render said material nonsorbent and nonclumping.

4. The animal waste collection system of claim 2 or claim 3, wherein the average particle size of said nonsorbent, nonclumping granular litter material, as measured by maximum dimension, is less than about 0.40 inches.

5. The animal waste collection system of claim 1, wherein said liquid sorbent means comprises a fluid pervious top sheet secured in overlying relation to a fluid impervious back sheet with a sorbent core interposed between said top sheet and said back sheet.

6. The animal waste collection system of claim 5, wherein said top sheet and said back sheet are bonded to another at least along their periphery.

7. The animal waste collection system of claim 5, wherein said sorbent core is comprised of a material selected from the group consisting of: comminuted wood pulp fluff, cellulosic tissue, polymeric gelling agents (PGA) and combinations thereof.

8. The animal waste collection system of claim 5, wherein said top sheet comprises nonwoven material.

9. The animal waste collection system of claim 5, wherein said top sheet comprises an apertured plastic film.

10. The animal waste collection system of claim 1, wherein said filter exhibits a pore size capable of inscribing a circle having a diameter between said 0.10 inches and about 0.650 inches.

11. The animal waste collection system of claim 10, wherein said filter is comprised of polymeric scrim material.

* * * * *

UNITED STATES PATENT AND TRADEMARK OFFICE
CERTIFICATE OF CORRECTION

PATENT NO.  : 5,038,721
DATED       : August 13, 1991
INVENTOR(S) : W. R. Ouellette, J. L. Hammons, B. W. Lavash It is certified that error appears in the above-identified patent and that said Letters Patent is hereby corrected as shown below:

In the ABSTRACT, line 32, "liqud" should read -- liquid -- .

Column 1, line 40, after "urine-soaked" delete -- o -- .

Column 2, line 50, after "combination" insert -- 100 -- .

Column 4, line 2, "it" should read -- its -- .

Column 4, line 3, "claw" should read -- claws -- .

Column 5, line 32, "solids" should read -- solid -- .

Column 5, line 42, "predetermine" should read -- perimeter -- .

Column 6, line 55, "said" should read -- about -- .

Signed and Sealed this

Twelfth Day of January, 1993

*Attest:*

DOUGLAS B. COMER

*Attesting Officer*     Acting Commissioner of Patents and Trademarks